(12) United States Patent
Furukawa et al.

(10) Patent No.: US 11,376,739 B2
(45) Date of Patent: Jul. 5, 2022

(54) WORKPIECE TRANSPORT ROBOT

(71) Applicant: FUJI CORPORATION, Chiryu (JP)

(72) Inventors: Kazuya Furukawa, Chiryu (JP);
Kazuyoshi Nagato, Toyoake (JP);
Shigefumi Suzuyama, Toyota (JP)

(73) Assignee: FUJI CORPORATION, Chiryu (JP)

( * ) Notice: Subject to any disclaimer, the term of this patent is extended or adjusted under 35 U.S.C. 154(b) by 192 days.

(21) Appl. No.: 16/640,252

(22) PCT Filed: Sep. 6, 2017

(86) PCT No.: PCT/JP2017/032053
§ 371 (c)(1),
(2) Date: Feb. 19, 2020

(87) PCT Pub. No.: WO2019/049228
PCT Pub. Date: Mar. 14, 2019

(65) Prior Publication Data
US 2020/0361093 A1    Nov. 19, 2020

(51) Int. Cl.
*B25J 9/16*    (2006.01)
*B25J 15/10*    (2006.01)

(52) U.S. Cl.
CPC .......... *B25J 9/1692* (2013.01); *B25J 9/1612* (2013.01); *B25J 9/1653* (2013.01); *B25J 9/1664* (2013.01); *B25J 15/106* (2013.01)

(58) Field of Classification Search
CPC ...... B25J 9/1692; B25J 9/1664; B25J 15/106; B25J 9/1612; B25J 13/085; B25J 15/0052;

(Continued)

(56) References Cited

U.S. PATENT DOCUMENTS

| 4,505,636 A | * | 3/1985 | Sugino | ............... B25J 15/0052 |
| | | | | 414/732 |
| 2014/0203582 A1 | * | 7/2014 | Harada | .................. B25J 15/00 |
| | | | | 294/213 |

(Continued)

FOREIGN PATENT DOCUMENTS

JP    2016-193463 A    11/2016

OTHER PUBLICATIONS

International Search Report dated Oct. 17, 2017 in PCT/JP2017/032053 filed Sep. 6, 2017.

*Primary Examiner* — Robert T Nguyen
(74) *Attorney, Agent, or Firm* — Oblon, McClelland, Maier & Neustadt, L.L.P.

(57)    ABSTRACT

A workpiece transport robot configured to determine whether a workpiece gripping failure has occurred, the workpiece transport robot including a transport robot main body having a driving mechanism configured to move a held workpiece; a robot hand having a first chuck and a second chuck configured to grip workpieces on both front and back faces of the robot hand; a robot hand rotating mechanism configured to axially support the robot hand and position the robot hand in a rotational direction with a servomotor, the robot hand supported with the transport robot main body via a rotation shaft to which first chuck and second chuck are symmetrically positioned, and a control device configured to compare measurement state information of the robot hand, of which information being based on torque information obtained by measuring and driving the servomotor; with workpiece gripping information obtained from a work program of the robot hand.

3 Claims, 5 Drawing Sheets

(58) Field of Classification Search
CPC ......... B25J 9/1653; G05B 2219/39478; G05B 2219/39505; G05B 2219/40583; B23Q 7/04
See application file for complete search history.

(56) References Cited

U.S. PATENT DOCUMENTS

2017/0008171 A1* 1/2017 Iwatake .................. B25J 9/1633
2019/0299408 A1* 10/2019 Sakai ...................... B25J 9/1664
2021/0387354 A1* 12/2021 Ota ........................ B25J 13/088

* cited by examiner

WORKPIECE TRANSPORT ROBOT

TECHNICAL FIELD

The present application relates to a workpiece transport robot having a robotic hand with a pair of chucks disposed with a rotation shaft interposed therebetween, the workpiece transport robot being capable of checking the clamping of a workpiece in the robot hand.

BACKGROUND ART

In a machine tool, a workpiece is gripped by a main spindle chuck, and a cutting tool is applied to the rotating workpiece to perform predetermined machining. In order to perform automatic machining of a workpiece in this machine tool, a workpiece transport robot for delivering the workpiece to and from the spindle chuck is required. The workpiece transport robot has a robot hand capable of gripping the workpiece. In this way, the workpiece is securely clamped by the chuck of the robot hand, the workpiece is accurately transferred to and from the main spindle chuck of a machine tool, and automatic machining of the workpiece is performed. For this reason, it is preferable to check whether the workpiece is securely clamped by the workpiece transport robot.

Patent Literature 1 discloses a robot system capable of determining abnormalities of the gripping state of a workpiece while the workpiece is gripped by a workpiece fixing device. In this conventional example, the robot hand clamps the workpiece. In this case, if foreign matter is sandwiched between the workpiece and the robot hand, the workpiece will be clamped in a tilted orientation, which makes it difficult to properly transfer the workpiece. Therefore, in the conventional example, interference torque is monitored by a control device with respect to a servomotor that rotationally drives the robot hand, and abnormalities of the gripping state of the workpiece are detected by comparing the interference torque with a threshold value.

PATENT LITERATURE

Patent Literature 1: JP-A-2016-193463

BRIEF SUMMARY

Technical Problem

There are various types of robot hands for workpiece transport robots, and one robot hand includes two chucks which are paired so that a workpiece can be gripped on both front and back faces. In such a robot hand, for example, a workpiece is conveyed between the robot hand and the main spindle chuck of a machine tool, and one chuck functions as a loader chuck for supplying a workpiece to be processed, and the other chuck functions as an unloader chuck for taking out a processed workpiece. In the case of the above-mentioned conventional example, the orientation of the gripped workpiece is detected, but with respect to the workpiece transport robot, since it is difficult to completely prevent falling of workpieces due to failure of gripping the workpiece with the robot hand, it is also necessary to assess such a state.

Therefore, it is an object of the present disclosure to provide a workpiece transport robot for determining a failure to grip a workpiece by simple means in order to solve the above-mentioned problem.

Solution to Problem

The workpiece transport robot of one aspect of the present disclosure has: a transport robot main body having a driving mechanism configured to move a held workpiece; a robot hand, assembled to the transport robot main body, having a first chuck and a second chuck configured to grip workpieces on both front and back faces of the robot hand; a robot hand rotating mechanism configured to axially support the robot hand and position the robot hand in a rotational direction with a servomotor, the robot hand being supported with the transport robot main body via a rotation shaft to which first chuck and second chuck are symmetrically positioned; measurement state information of the robot hand based on torque information obtained by measuring and driving with the servomotor; and a control device configured to perform a state comparison determination by comparing measurement state information of the robot hand, of which information being based on torque information obtained by measuring and driving the servomotor; with workpiece gripping information obtained from a work program of the robot hand.

Advantageous Effects

With the above configuration, the robot hand rotates about the rotation shaft by the measuring and driving by the servomotor, the measurement state information of the robot hand is obtained from the torque information obtained in a state in which the rotation is stopped, and the state comparison with the workpiece gripping information, being obtained from the work program of the robot hand, is performed, thereby making it possible to check for workpiece gripping failure.

DESCRIPTION OF EMBODIMENTS

Next, an embodiment of the workpiece transport robot of the present disclosure will be described below with reference to the drawings. In the present embodiment, a workpiece transport robot for transferring a workpiece in a processing machine line will be described as an example. The processing machine line is configured by arranging multiple machine tools, inspection machines, and the like that perform machining on a workpiece, and the workpiece transport robot conveys the workpiece in accordance with the machining step of each of the machine tools and the like in order. Both the machine tool and the workpiece transport robot have a chuck mechanism, and transferring the workpiece is performed by the gripping operation of the chuck mechanism.

Figure 1:
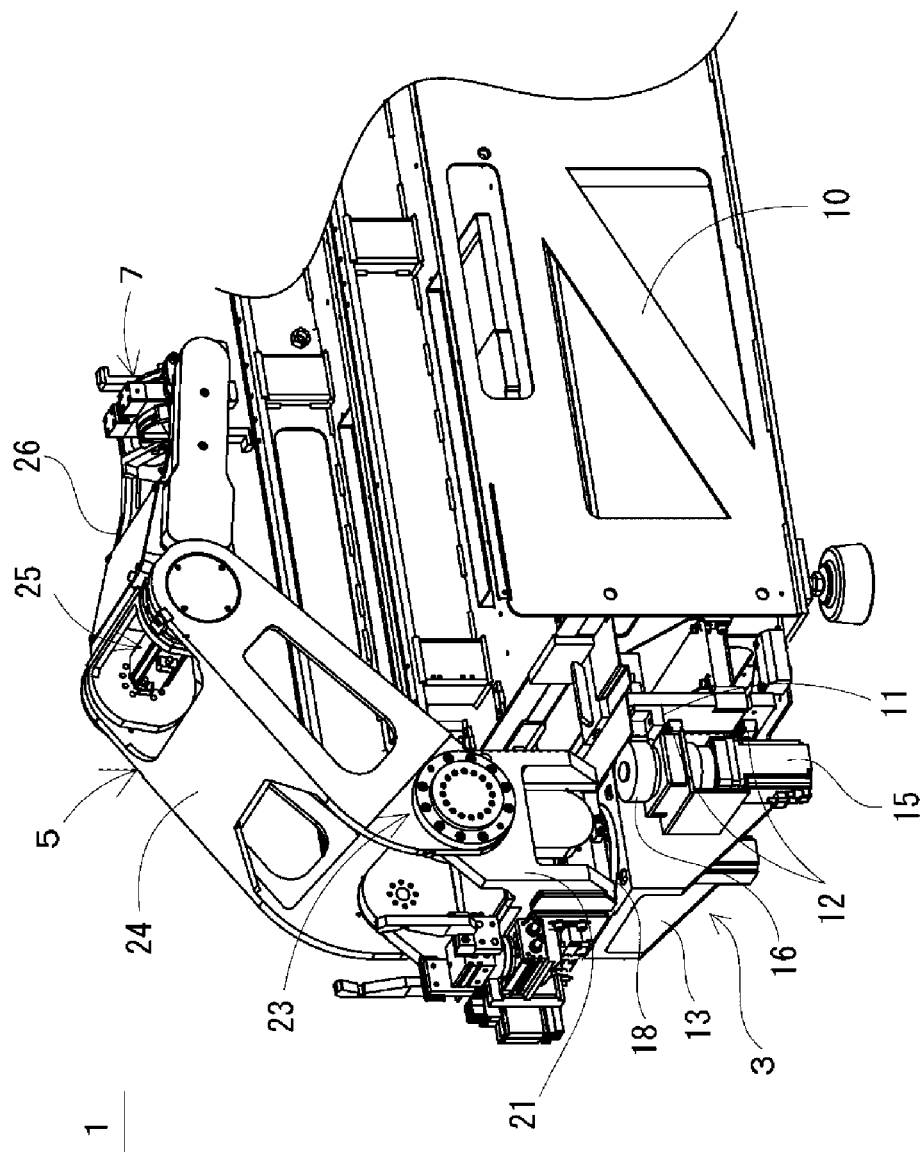
FIG. 1 A perspective view of an embodiment of a workpiece transport robot in an extended state.
Figure 2:
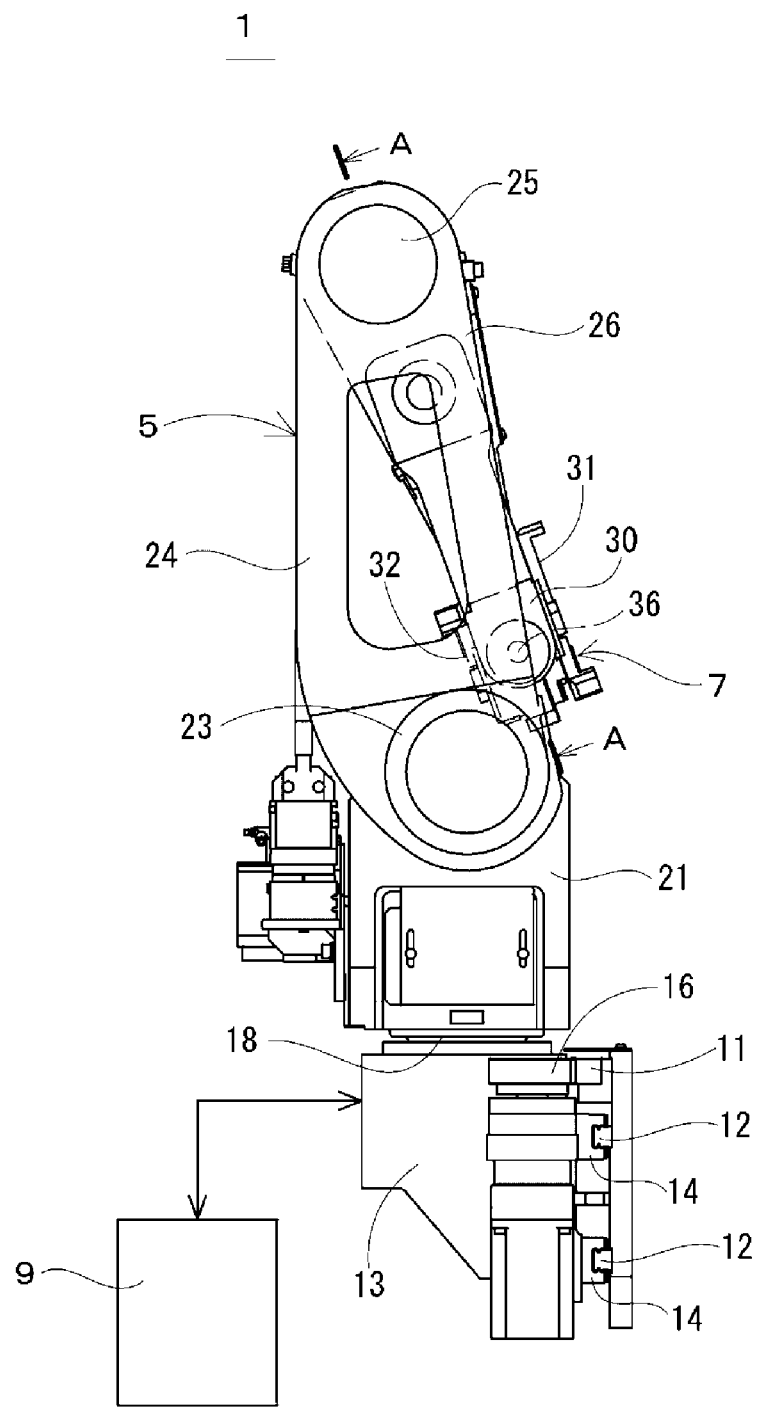
FIG. 2 A side view of the embodiment of the workpiece transport robot in a collapsed state.

FIGS. 1 and 2 are diagrams showing a workpiece transport robot, and FIG. 1 shows a state in which articulated robot 5 is extended in order to transfer a workpiece to and from a machine tool. FIG. 2 is a side view showing a state in which articulated robot 5 is collapsed for the purpose of transportation. In the processing machine line on which workpiece transport robot 1 is mounted, multiple machine tools and the like are arranged side by side on base 10. In the drawings, base 10 for two machine tools is shown, but by increasing the number of bases 10, the number of machine tools and the like corresponding to processing of the workpiece can be arranged. Workpiece transport robot 1 is assembled at the front of base 10 via traveling device 3.

In traveling device 3, rack 11, and rail 12 extending in the horizontal direction are fixed in parallel with the front face of a base 10. Traveling slider 14, which grips rail 12 and slides, and traveling motor 15, which serves as a driving source, are integrally formed with traveling table 13. Pinion 16 is fixed to the rotation axis of traveling motor 15, and is engaged with rack 11. Accordingly, in traveling device 3, traveling table 13 freely moves along the processing machine line by the driving of traveling motor 15 and can be stopped in accordance with the position of a corresponding machine tool or the like. Articulated robot 5 is mounted on traveling table 13 via rotary table 18. Articulated robot 5 can move freely, and the direction of workpiece transport robot 1 can be changed freely by the drive control of a rotation servomotor.

In articulated robot 5, support base 21 is fixed to rotary table 18, and upper arm member 24 is connected to support base 21 via first joint mechanism 23. Further, front arm member 26 is connected to upper arm member 24 via second joint mechanism 25. Accordingly, in articulated robot 5, by driving the joint motors constituting first joint mechanism 23 and second joint mechanism 25, the angles of upper arm member 24 and front arm member 26 are adjusted, and the form can be changed between a collapsed state shown in FIG. 2 and an extended state shown in FIG. 1.

Figure 3:
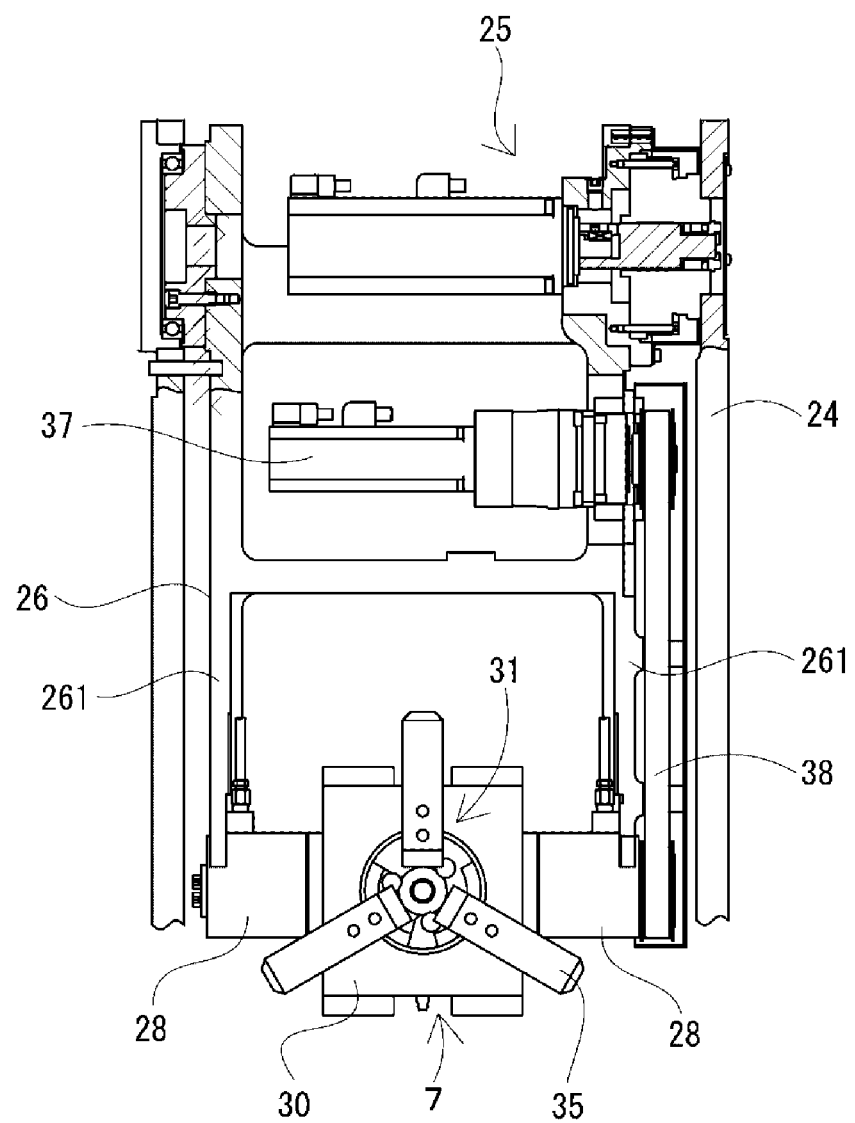
FIG. 3 A partial cross-sectional view of the articulated robot shown in FIG. 2 taken along the line A-A.

Articulated robot 5 is assembled with robot hand 7, robot hand 7 being capable of gripping a workpiece at the distal end of robot hand 7. FIG. 3 is a partial cross-sectional view of articulated robot 5 shown in FIG. 2 taken along the line A-A. Robot hand 7 is assembled to the distal end of front arm plate 261 constituting front arm member 26. That is, front arm plate 261 is provided to both the left and right sides, and main body block 30 is rotatably supported at the distal end of front arm plate 261 via bearing 28. Robot hand 7 is configured with first chuck 31, facing main body block 30 and shown in the figure (see FIG. 2), and second chuck 32, on the opposite side of main body block 30.

First chuck 31 and second chuck 32 are disposed symmetrically on both front and back faces of main body block 30 about rotation shaft 36 (see FIG. 2), and three chuck claws 35, assembled radially at intervals of 120 degrees, constitute a chuck mechanism that is operated to open and close by way of a hydraulic mechanism. Therefore, in robot hand 7, three chuck claws 35 are operated in each of first chuck 31 and second chuck 32 to grip and release workpieces.

Articulated robot 5 is provided with a robot hand rotating mechanism for positioning robot hand 7 in a rotational direction. That is, hand motor 37, which is a servomotor, is fixed to the second joint mechanism 25 side of front arm member 26, and belt 38 spans across pulleys fixed to the output shaft of hand motor 37 and rotation shaft 36. Thus, the rotational output of hand motor 37 is transmitted to rotation shaft 36 of robot hand 7 via belt 38, and the rotation angle of robot hand 7, that is, the chuck faces of first chuck 31 and second chuck 32 can be adjusted to any angle.

Workpiece transport robot 1 is provided with control device 9, which controls the entire drive (see FIG. 2), and drive control for executing predetermined work content is performed for traveling motor 15 of traveling device 3, joint motor of articulated robot 5, hand motor 37 of robot hand 7, the hydraulic mechanism of robot hand 7, and the like. Therefore, the memory of control device 9 stores a work program for executing drive control of each part in accordance with the work content thereof. Further, in the present embodiment, a clamp checking program is also stored, the clamp checking program being a program for executing a workpiece clamping check that is performed between work steps.

Therefore, in workpiece transport robot 1, the following operation is executed by the drive control by control device 9. First, in workpiece transport robot 1, pinion 16 rotates rack 11 under the drive control of traveling motor 15, and traveling table 13 moves along rail 12. Traveling table 13 then stops at a predetermined position at which the workpiece is transferred and articulated robot 5 is positioned. Articulated robot 5 stands upright when moving, as shown in FIG. 2, and changes its form so as to extend, as shown in FIG. 1, when performing an operation in a stopped position, for example, taking out a workpiece from a supply pallet or transferring a workpiece to or from a machine tool.

In the driving of articulated robot 5, the angles of upper arm member 24 and front arm member 26 are adjusted by rotation control of the joint motor in which first joint mechanism 23 and second joint mechanism 25 are servomotors, and robot hand 7 is moved to a set work position. In robot hand 7, first chuck 31 and second chuck 32 open and close the three chuck claws 35 to clamp or unclamp a workpiece.

Incidentally, in workpiece transport robot 1, the workpiece is reliably gripped by robot hand 7, and the workpiece is conveyed to the next step. However, it is difficult to completely prevent robot hand 7 from failing to grip a workpiece and dropping the workpiece. Therefore, in workpiece transport robot 1 of the present embodiment, the workpiece clamping checking process is executed in accordance with the clamp checking program stored in the memory of control device 9.

Figure 4:
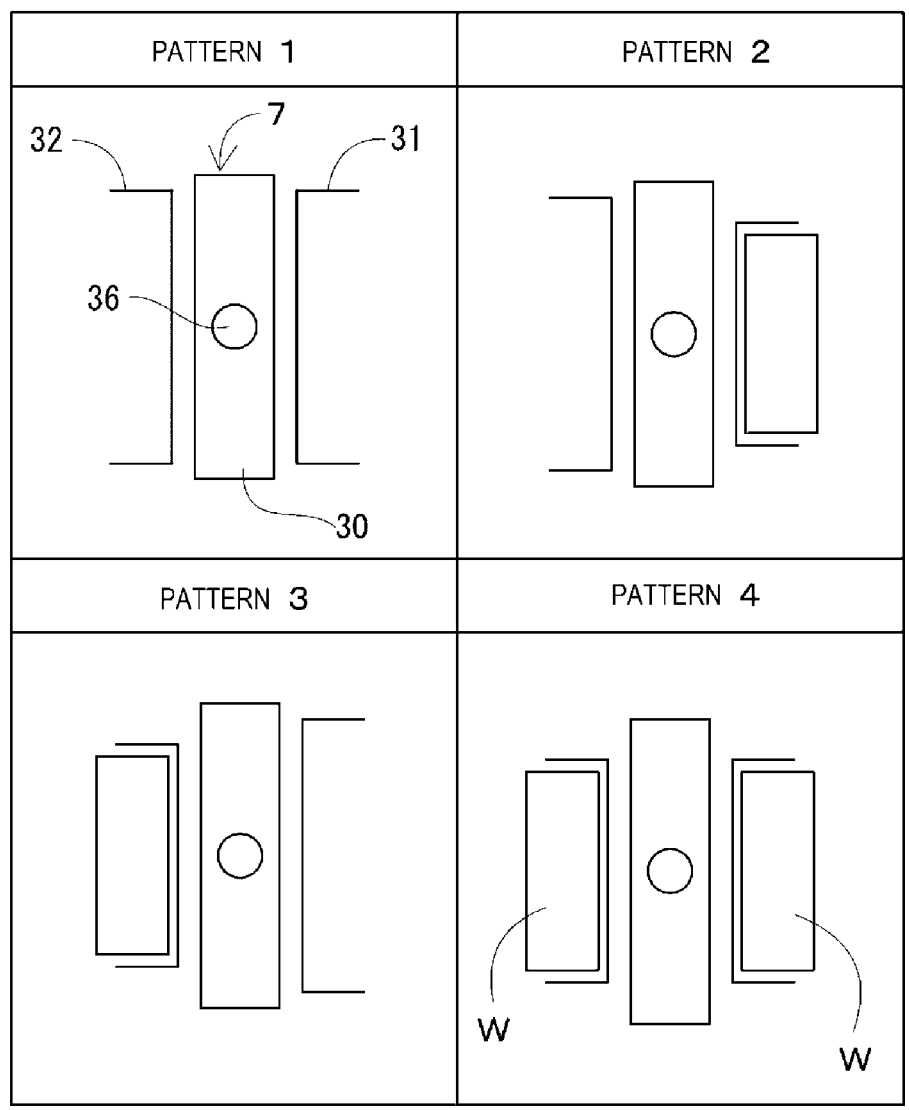
FIG. 4 A diagram showing workpiece gripping patterns in a robot hand.

FIG. 4 is a diagram showing workpiece gripping patterns performed by robot hand 7. In robot hand 7 provided with two chucks, four patterns in this manner are possible in the workpiece transport step. That is, the gripping state of patterns 2 to 4 for gripping workpiece W with one or both chucks and the non-gripping state of pattern 1 without workpiece W. The gripping pattern in each step of robot hand 7 can be acquired from a work program in which is recorded a series of work contents for workpiece transport robot 1.

On the other hand, when the rotation of robot hand 7 is stopped and the orientation is maintained, a static torque is generated in hand motor 37, and a current corresponding to the static torque flows. Therefore, in the clamp checking program, when robot hand 7 is measured/driven and stopped at a predetermined rotation angle, the value of the current thereof is used as torque information for checking the gripping of the workpiece. In particular, in the measuring/driving of the present embodiment, as shown in FIG. 4, the rotation angle of robot hand 7 is adjusted so that first chuck 31 and second chuck 32 are at the same height, and the adjustment is performed based on the torque information of hand motor 37 in accordance with the drive control.

In the patterns shown in FIG. 4, in the substantially balanced cases of patterns 1 and 4, the value of the current corresponding to the static torque is small, and in the case of patterns 2 and 3 in the unbalanced state, on the contrary, the static torque is large and the value of the current is large in order to maintain the orientation. Therefore, by using such a clearly distinguishable value of the current as torque information, measurement state information is obtained by comparing the value of the current with a set threshold value. The measurement state information identifies the gripping pattern as patterns 1, 4 when the value of the current is smaller than the threshold value, and identifies the gripping pattern as patterns 2, 3 when the value of the current is larger than the threshold value.

In the clamp checking process, a state comparison determination is performed to compare the gripping patterns acquired from the work program with the gripping patterns acquired from the measurement state information. However, in the present embodiment, while workpiece transport robot 1 transfers a workpiece in the processing machine line, a step in which the workpiece is likely to be gripped by robot hand 7 is specifically selected, and the state comparison determination is performed only in this step. This is because, despite robot hand 7 rarely having problems of workpiece gripping failure, if gripping failure does occur, it is most likely to be in a particular process, such as a step in which frictional resistance between a workpiece and the chuck claw is reduced due to processing.

Figure 5:
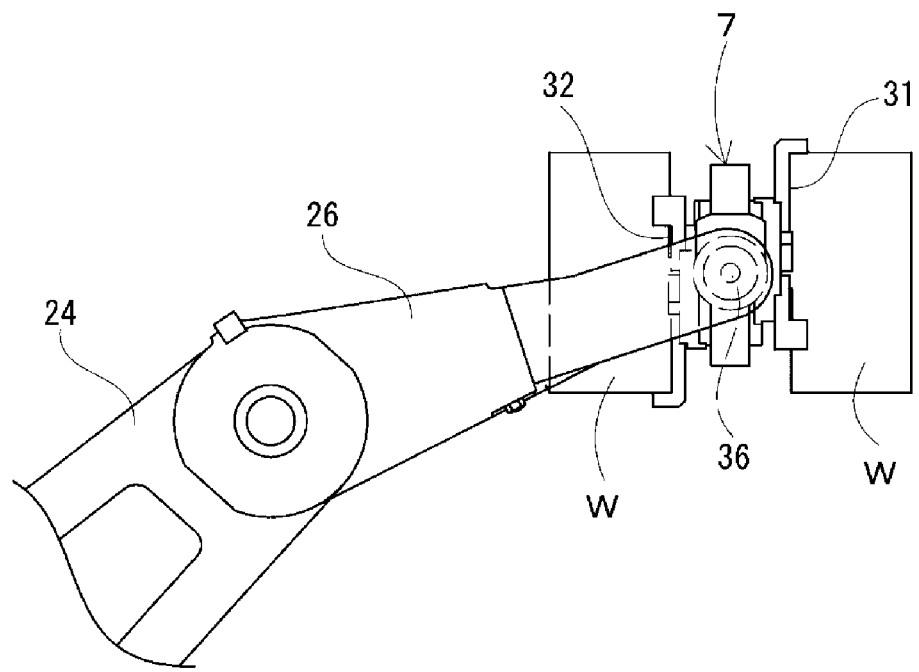
FIG. 5 A diagram showing a robot hand when a clamp checking process is executed.

FIG. 5 is a diagram showing a situation in which the state comparison determination is performed in the selected step. Specifically, this is a step in which a new workpiece W and a processed workpiece W are exchanged between machine tools. Therefore, in this step, since the workpiece gripping information acquired from the work program is pattern 4, if the value of the current corresponding to the static torque is smaller than the threshold value, it can be confirmed that the state is a normal state by state comparison determination with the measurement state information. On the other hand, when the value of the current corresponding to the static torque is larger than the threshold value, workpiece W is not gripped by either of first chuck 31 or second chuck 32, and it can be confirmed by the state comparison determination that workpiece W is not in a normal state, and a warning process of operating a warning device is performed by control device 9.

Although not specifically shown, except in the situation shown in FIG. 5, workpiece W may be gripped by one of first chuck 31 or second chuck 32, and workpiece W may be supplied to or taken out from the machine tool. In this case, since the workpiece gripping information acquired from the work program is pattern 2 or pattern 3, if the value of the current corresponding to the static torque is larger than the threshold value, it can be confirmed by the state comparison determination that the workpiece is in a normal state. On the other hand, when the value of the current corresponding to the static torque is smaller than the threshold value, since workpiece W is in pattern 1 which is not gripped, it is assessed as an error by the state comparison determination, and a warning process of operating the warning device is performed by control device 9.

In the present embodiment, as described above, the clamp checking process determines that the workpiece piece in robot hand 7 is not gripped. That is, it is determined whether the workpiece gripping schedule of pattern 4 has become pattern 2 or 3, or the workpiece gripping schedule of pattern 2 or 3 has become pattern 1. This determination can be performed by a simple process of only checking the value of the current corresponding to the static torque. In addition, since the clamp checking process is performed only by setting first chuck 31 and second chuck 32 at the same height, the clamp checking process can be performed in an extremely short time and in a series of work operations performed by workpiece transport robot 1. Further, since the work step in which a workpiece gripping failure may occur is selected, it is possible to make necessary and sufficient assessments of the operation of workpiece transport robot 1 performed in the processing machine line.

Incidentally, in the present embodiment, patterns 1 and 4 and patterns 2 and 3 are not distinguished in the measurement state information. There is no assumption that the workpiece gripping schedule of pattern 4 becomes pattern 1 due to a workpiece gripping failure. It is not that workpiece gripping failure rarely occurs but rather that the probability of failure occurring in both chucks simultaneously is extremely small. However, if each determination is required, each pattern may be identified from the waveform of the current generated in response to the static torque.

Although an embodiment of the present disclosure has been described above, the present disclosure is not limited thereto, and various modifications can be made without departing from the spirit thereof. For example, in the embodiment described above, an example in which articulated robot 5 constitutes a transport robot main body as the workpiece transport robot has been described, but robot hand 7 may be mounted on a gantry loader. In the above embodiment, the clamp checking process of the workpiece is performed at a necessary timing, but the state comparison determination may be performed at all timings at which robot hand 7 grips a workpiece.

REFERENCE SIGNS LIST

1 . . . Workpiece transport robot, 3 . . . Running device, 5 . . . Articulated robot, 7 . . . Robot hand, 9 . . . Control device, 31 . . . First chuck, 32 . . . Second chuck, 35 . . . Chuck claw, 36 . . . Rotation shaft, 37 . . . Hand motor

The invention claimed is:

1. A workpiece transport robot, comprising:
a transport robot main body having a driving mechanism configured to move a held workpiece;
a robot hand, being assembled to the transport robot main body, which has a first chuck and a second chuck configured to grip workpieces on both front and back faces of the robot hand;
a robot hand rotating mechanism configured to axially support the robot hand and position the robot hand in a rotational direction with a servomotor, the robot hand being supported with the transport robot main body via a rotation shaft of the robot hand rotating mechanism to which first chuck and second chuck are symmetrically positioned, and
processing circuitry configured to perform a state comparison determination by comparing measurement state information of the robot hand, of which information being based on torque information obtained by measuring and driving the servomotor; with workpiece gripping information obtained from a work program of the robot hand.

2. The workpiece transport robot of claim 1, wherein the processing circuitry arranges the first chuck and the second chuck at the same height by measurement driving of the servomotor, and either one of the torque information in the balanced state or torque information in the unbalanced state is defined as the measurement state information.

3. The workpiece transport robot of claim 1, wherein the processing circuitry performs the state comparison determination only in one or more specific transfer steps among multiple workpiece transfer steps.

* * * * *